United States Patent

Sugiyama et al.

[11] 4,014,528
[45] Mar. 29, 1977

[54] GAS CUTTING MACHINE

[75] Inventors: Noboru Sugiyama; Yoshitugu Watanabe; Hiroshi Yamamoto, all of Tokyo, Japan

[73] Assignee: Koike Sanso Kogyo Co., Ltd., Tokyo, Japan

[22] Filed: Dec. 11, 1975

[21] Appl. No.: 639,711

[30] Foreign Application Priority Data

| Apr. 22, 1975 | Japan | 50-48162 |
| June 18, 1975 | Japan | 50-73161 |
| June 23, 1975 | Japan | 50-75464 |

[52] U.S. Cl. ............................................. 266/66
[51] Int. Cl.[2] ........................................ B23K 7/10
[58] Field of Search ............................... 266/66–68

[56] References Cited

UNITED STATES PATENTS

| 3,071,361 | 1/1963 | Jacobs | 266/66 |
| 3,170,015 | 2/1965 | Ziebart | 266/66 |
| 3,396,957 | 8/1968 | Rowland | 266/66 |

Primary Examiner—Roy Lake
Assistant Examiner—Paul A. Bell
Attorney, Agent, or Firm—Fleit & Jacobson

[57] ABSTRACT

This invention relates to a semi-automatic gas cutting machine which is capable of being operated with one hand freely. More particularly, it relates to a gas cutting machine which enables the steel cutting by: mounting in combination with a controlling apparatus which controls a motor and the rotation thereof, a transmission axis having a first gear at the top and being capable of transmitting the rotation of said motor, a second gear mounted so as to engage with said first gear and rotate around a device head freely, and a driving wheel which is capable of rotation by contacting the outer periphery thereof with said second gear around the device head respectively; and travelling the device head and a cutting nozzle attached to it by the rotation of a driving wheel at the gas cutting.

5 Claims, 8 Drawing Figures

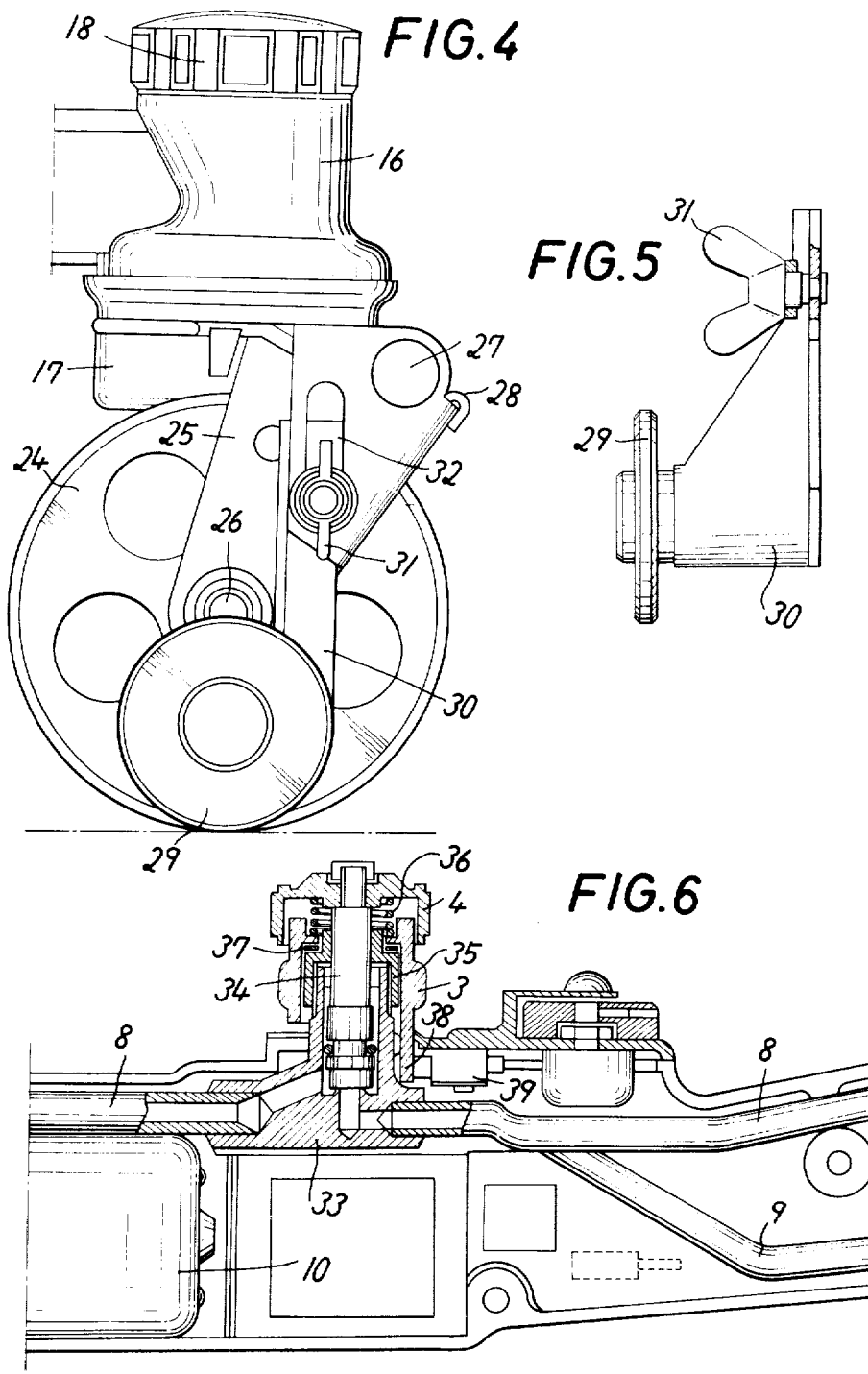

GAS CUTTING MACHINE

BACKGROUND OF THE INVENTION

Recently, a large number of automatic gas cutting machines have been developed and have come to be used in various industrial fields.

However, the large number of automatic gas cutting machines have such defects as the difficulty of using in narrow spaces, difficulty of transporting and a high price.

On the other hand, the hand-operated gas cutting machine which has conventionally used is a cylindrical type and has such defects as the necessity of training in use, the difficulty of continuous use for long periods because the heavy weight of the gas cutting machine and the difficulty of correct cutting with it.

The gas cutting machine according to this invention is to provide a novel technique which fundamentally improves the conventional defects described above. In particular, the present invention relates to a semiautomatic gas cutting machine which enables it to travel automatically in the correct direction always maintaining the cutting nozzle of the gas cutting machine at a constant and correct height by mounting a movable wheel around the gas cutting machine so as to rotate freely, and moving said wheel by means of gear driven by a motor.

In particular, the gas cutting machine according to this invention is capable of operation with one hand freely; capable of use even in a very narrow space; capable of simple transportation and treatment; capable of obtaining a cutting surface having a high accuracy; and capable of high production at very low cost compared with the conventional large type of automatic gas cutting machine.

BRIEF DESCRIPTION OF THE DRAWINGS

FIG. 4 is a front view of FIG. 3;

FIG. 5 is a side view which shows auxiliary parts used in the gas cutting machine shown in FIG. 3 and FIG. 4;

FIG. 6 is a vertical sectional view of a valve switch used in the gas cutting machine in FIG. 1 or FIG. 3;

DETAILED DESCRIPTION OF THE DRAWINGS

Figure 1:
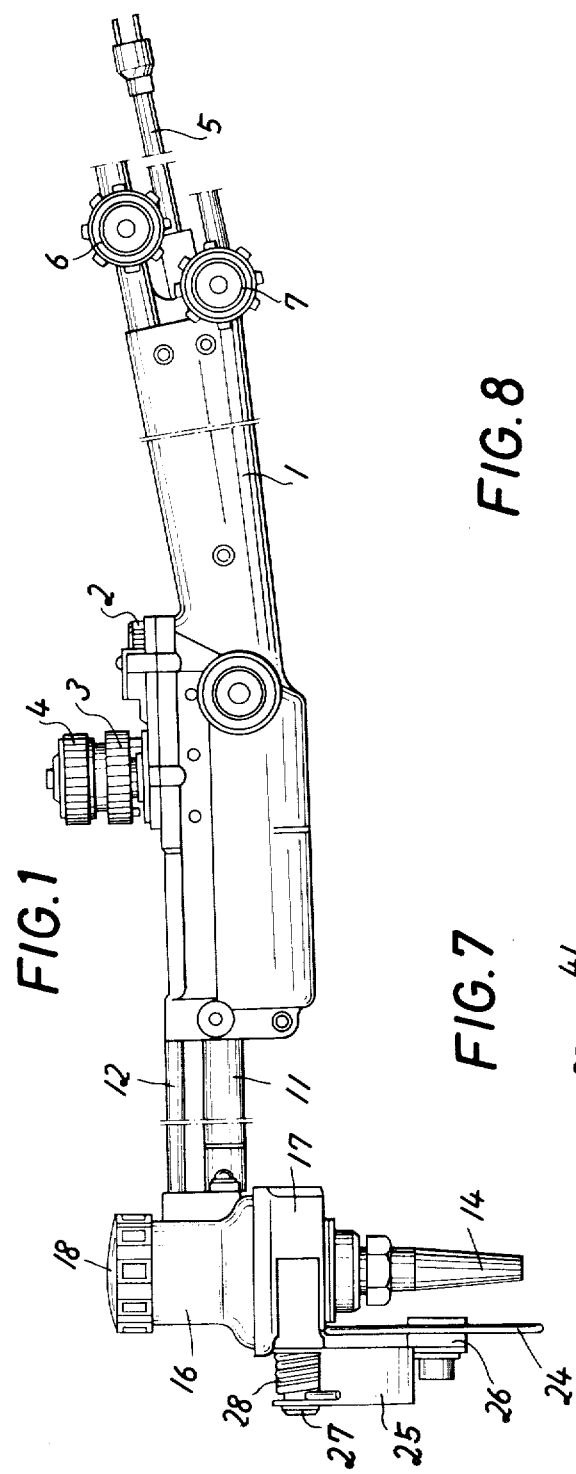
FIG. 1 is a side view of the gas cutting machine according to this invention.
Figure 2:
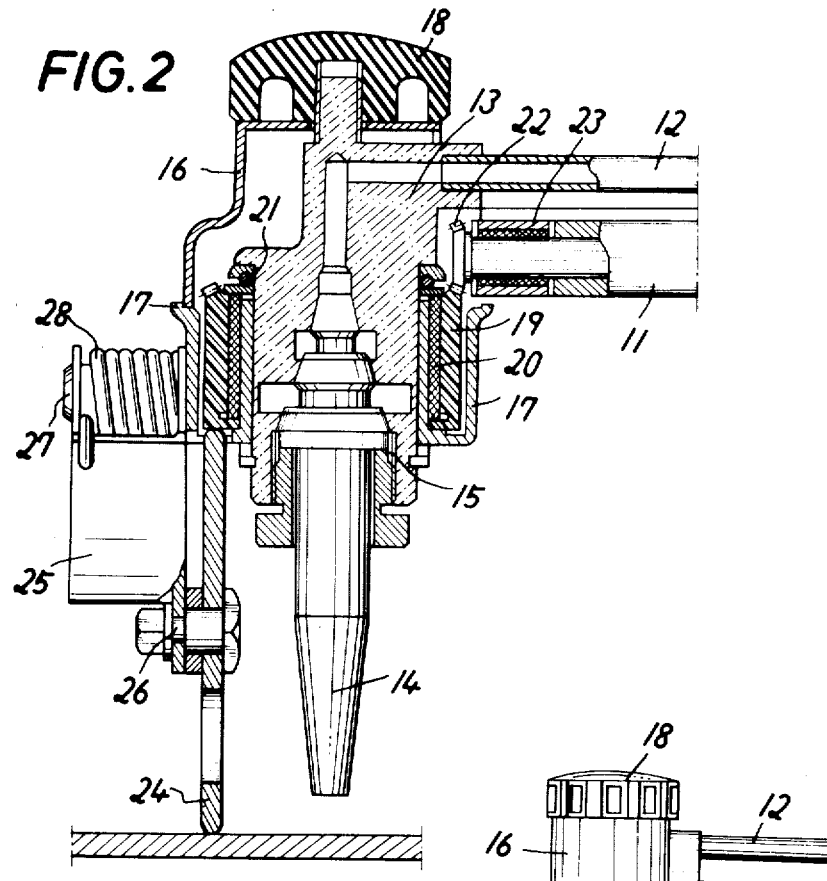
FIG. 2 is a vertical sectional view of the top part of the gas cutting machine iilustrated in FIG. 1.

Referring now to the drawings in detail according to this invention, in FIG. 1, FIG. 2 and FIG. 6, the numeral 1 indicates a grip of the gas cutting machine, on which a knob for adjusting the velocity 2, a knob of driving switch 3, and a valve handle 4 is protrusively mounted respectively.

At the end of the grip 1, a cap tyre-code for supply of electric power 5, a valve for supply of the preheated oxygen 6, and a valve for supply of the fuel gas 7 are mounted. Further, the grip 1 incldues a pipe line 8 for supply of the oxygen connected with valve 6, a pipe line 9 for supply of the fuel gas connected with valve 7, and a motor 10 on the inside thereof. At the top end of the grip 1, a transmission axis 11 of a flexible ball joint which is capable of rotating a first bevel gear etc. connected with said motor 10 and mounted in a device head described hereafter, a pipe 12 which is possible to supply oxygen for cutting and a pipe, not shown in the drawing, for supply of preheated oxygen or fuel gas, is protrusively mounted respectively.

Numeral 13 is a device head connected to said pipe 12, and at the inside, an attached part of nozzle 15 of the gas cutting nozzle 14 is perforated. The device head 13 is included within an upper casing 16 and a lower casing 17. The upper casing 16 is firmly fixed to said device head 13, and the lower casing 17 is mounted to said device head 13 so that it may rotate freely along the lower edge of said upper casing 16. Further, at the upper part of said device head 13, a knob 18 by which the upper casing 16 and the lower casing 17 may be bolted, is screwed.

At the inside of the lower casing 17 mounted around the outside of the device head 13, a second bevel gear 19 is mounted so as to rotate horizontally on the axis of device head 13 through bearing metals 20, bearings 21 etc. Further, the second bevel gear 19 is engaged with the first bevel gear 22 attached to the one end of the transmission axis 11 described above. The numeral 23 is a bearing of the bevel gear. The numeral 24 is a driving wheel adjacent to the side of the gas cutting nozzle 14 and is attached to an axis 26 mounted on the lower part of a bracket 25 so as to rotate freely in the vertical direction. Further, the driving wheel 24 is constructed so as to be driven by the rotation of the second bevel gear 19, being always pressed to the lower part of the second bevel gear 19 described above by a coil screw spring 28 attached to an axis 27 at the upper part of the bracket 25. Further more, said bracket 25 is attached to the lower casing 17 so that it may be removably secured by the axis 27.

Accordingly, said driving wheel 24 enables movement of the entire cutting machine in a certain direction with the lower casing 17 by being capable of horizontal rotation on an axis which connects the device head 13 to the nozzle 14 and by the vertical rotation using the axis 26 as a fulcrum via rotation of the second bevel gear 19 simultaneously.

The gas cutting machine according to this invention enables the gas cutting of the steel plate to be cut by: firing the gas cutting nozzle 14 by supplying the oxygen for cutting preheated oxygen and fuel gas; rotating the first bevel gear 22 and the second bevel gear 19 by driving the motor 10; rotating the driving wheel 24 connected closely with the second bevel gear 19; moving the gas cutting machine along the surface of the steel plate to be cut; always maintaining the height of the gas cutting nozzle 14 constant against said steel plate to be cut; and moving the gas cutting nozzle 14 in a certain direction.

Figure 3:
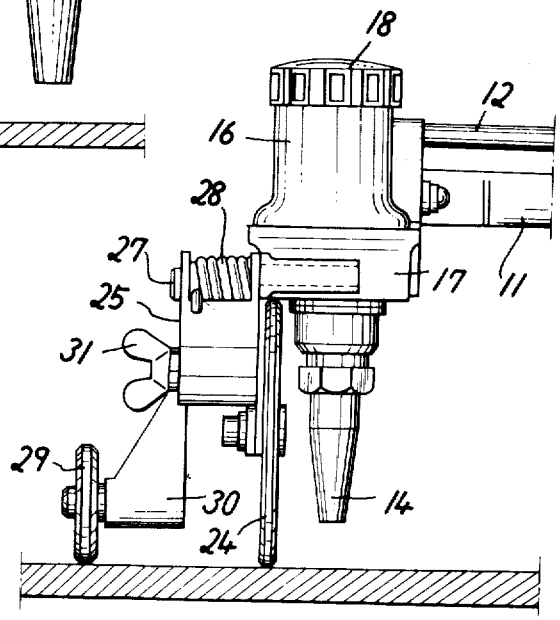
FIG. 3 is a side view of a top part shown in another Example.

Referring to FIG. 3, FIG. 4 and FIG. 5, the numeral 29 is an auxiliary wheel fitted so as to rotate freely to an axis of a second bracket 30 which is removably secured to a long hole 32 in the vertical direction against the bracket 25 through the bolts and wing nuts 31.

By mounting the auxiliary wheel 29 to the one side of the driving wheel 24 and contacting said auxiliary wheel 29 and driving wheel 24 with the earth simultaneously, the gas cutting machine can travel always in a safe condition preventing any fluctuation of a wick of the gas cutting nozzle 14, and to be operated simply and surely by even those not skilled in its operation.

Figure 8:
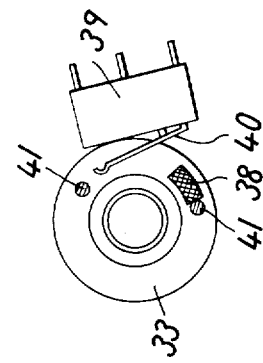
FIG. 7 and FIG. 8 are the illustrated views of action of a switch used in the valve switch in FIG. 6.
Figure 7:
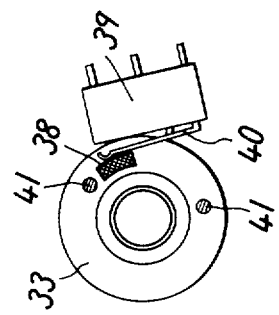

FIG. 6, FIG. 7 and FIG. 8, numerals 33, 34, 35, 36, 4, and 3 represents a valve mounted on the way of supplying pipe of oxygen for cutting, a spindle, a tightening nut, coil springs, a valve handle and a knob for driving switch respectively, and these are removably secured on the tightening nut 35 described above through the bearings made of nylon 37.

Further, at the lower part of the knob of driving switch 3, a hook 38 is projected downward, and at the outside of the hook 8, a switch 39 is mounted adjacently.

The relation between the switch 39 and the hook 38 is formed so that a contact lever 40 protrusively mounted to the switch 39 may contact with or separate from the hook 38 when the hook 38 moves with the revolution of the knob 3. On the other hand, two stoppers 41 are protrusively mounted on the valve body 33. Thereby, the travelling range of the hook 38 is formed so as to be controlled.

Accordingly, when the valve handle 4 is rotated to open the valve body 33, the knob of driving switch 3 contacted firmly with the valve handle 4 through the coil springs 36 is also rotated with the valve handle 4, and the hook 38 projected to the knob 3 is contacted with the contact lever 40 of the switch 39. Then, an electrical signal is transmitted to the motor 10 from the switch 39 and the motor 10 can be operated. Accordingly, both the supply of the oxygen for cutting and the operation of the driving wheel 24 can be simultaneously effected by the rotation of the valve handle 4.

It is also possible to drive the driving wheel 24 only by transmission of the signals to the motor 10 irrespective of the opening and shutting of the valve by rotating the knob of driving switch 3.

The valve switch according to this invention having such form described above can practice the spout of the oxygen for cutting and the driving of the gas cutting machine simultaneously by only rotating the valve handle, and can save the waste of the fuel together with making the operation of the gas cutting very easy.

We claim:

1. A gas cutting machine for cutting a steel plate comprising, a motor, a transmission axis connected to said motor, a first gear connected to said transmission axis, a device head having a gas cutting nozzle, a second gear mounted around said device head and rotatable in a horizontal direction by rotation of said first gear, a driving wheel rotatable in a vertical direction and adapted to move along the steel plate to be cut, a bracket means for supporting said driving wheel adjacent to said gas cutting nozzle whereby the driving wheel is pressed against the lower surface of said second gear for rotation thereby, control means for actuating said motor and transmission axis, and pipe means for supplying oxygen preheated, preheated oxygen, and fuel gas to said gas cutting nozzle.

2. The invention of claim 1 further comprising an auxiliary wheel mounted on a second bracket so as to rotate freely thereon, said second bracket mounted adjacent said driving wheel.

3. The invention of claim 1 wherein said control means comprises a driving switch knob, a valve handle, means for engaging said driving switch knob with said valve handle comprising a compressed coil spring between a tightening nut and said valve handle, a hook connected to said driving switch knob and projecting downward therefrom, a switch means for transmitting power to said motor adapted to be actuated by said hook upon movement of said driving switch knob, a valve means for controlling the supply of oxygen, said valve means actuated by movement of said valve handle, whereby movement of said valve handle is adapted to actuate said valve means and said switch means.

4. The invention of claim 1 wherein said device head is included within an upper casing and a lower casing, said bracket means comprises a bracket removably secured to said lower casing through an axis.

5. The invention of claim 4 wherein said device head is connected to said upper casing, said lower casing mounted to said device head and freely rotatable with respect to said upper casing, wherein said driving wheel is freely rotatable about said device head.

* * * * *